J. J. DUBÉ.
COMBINED GARBAGE BURNER AND WATER HEATER.
APPLICATION FILED JUNE 3, 1910.
Reissued Aug. 16, 1910.
13,143.
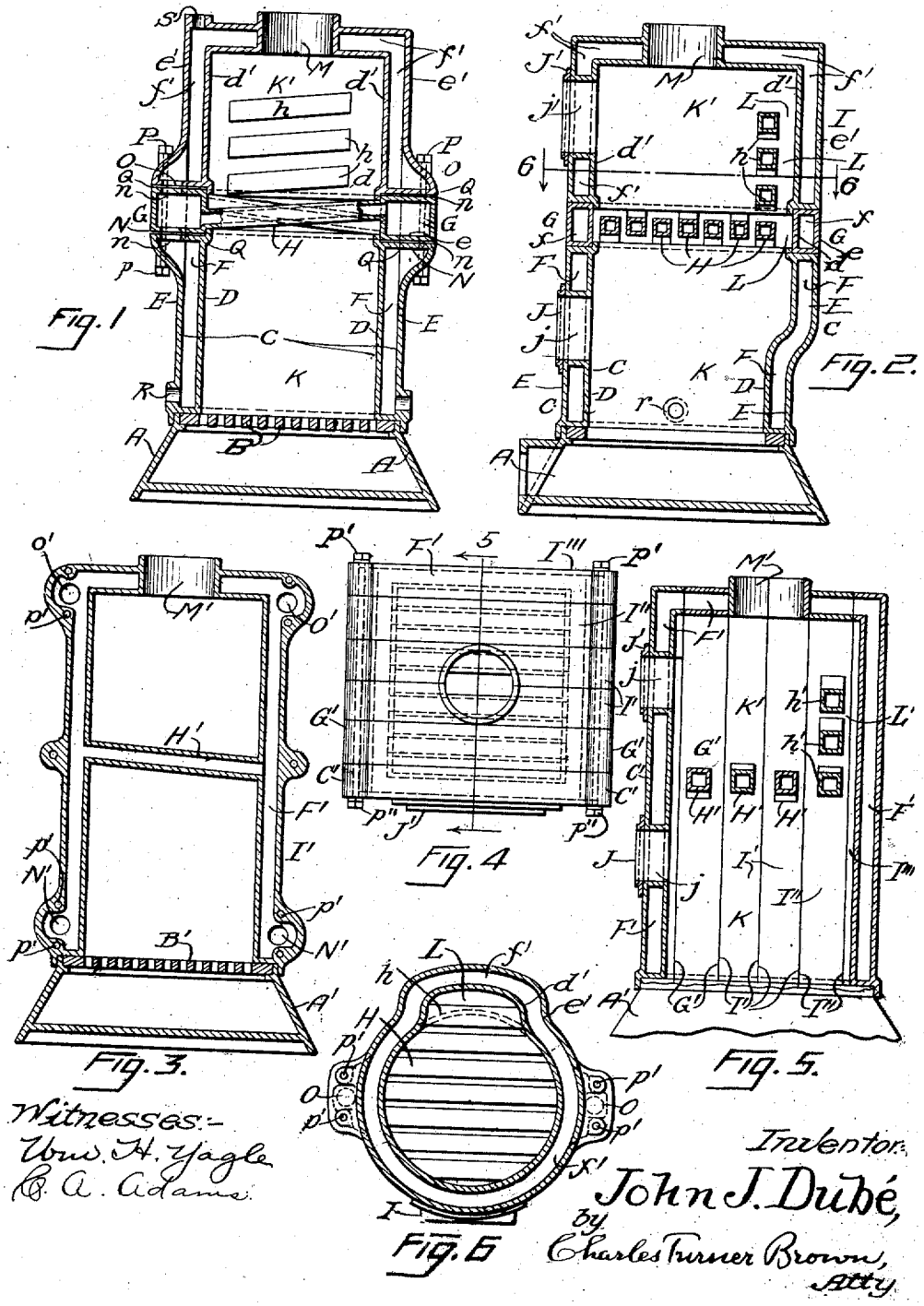
Witnesses:-
Wm. H. Yagle
R. A. Adams.
Inventor:
John J. Dubé,
by
Charles Turner Brown,
Atty.

UNITED STATES PATENT OFFICE.

JOHN J. DUBÉ, OF CHICAGO, ILLINOIS, ASSIGNOR TO MARGARET H. DUBÉ, OF CHICAGO, ILLINOIS.

COMBINED GARBAGE-BURNER AND WATER-HEATER.

13,143. Specification of Reissued Letters Patent. Reissued Aug. 16, 1910.

Original No. 907,580, dated December 22, 1908, Serial No. 431,399. Application for reissue filed June 3, 1910. Serial No. 564,887.

*To all whom it may concern:*

Be it known that I, JOHN J. DUBÉ, a citizen of the United States, and a resident of Chicago, in the county of Cook and State of Illinois, have invented certain new and useful Improvements in a Combined Garbage-Burner and Water-Heater, of which the following, when taken in connection with the drawing accompanying and forming a part hereof, is a full and complete description sufficient to enable those skilled in the art to which it pertains to understand, make, and use the same.

This invention relates to devices used to heat water and to consume garbage; such devices being arranged so that the heating of the water and the burning of the garbage is effected by the use of fuel, usually coal, in the fire box of the device when the garbage is placed on a grate arranged therefor above the fire box, and the object of this invention is to provide means whereby the shell or casing of the device, and the grate of the garbage burning portion thereof may, when desired, all be cast in a plurality of pieces which may be readily assembled and secured together; to obtain means whereby the capacity of the device embodying this invention may be varied by a variation of the number of the parts used in the construction thereof; to obtain a device which will be economically built, simple, easily assembled, and readily operated by one not specially skilled in the management of heaters or boilers; and to obtain a device by means of which garbage will be quickly consumed without odor.

In the drawing referred to Figure 1 is a vertical sectional view of the combined water heater and garbage burner embodying the invention. Fig. 2 is a vertical sectional view, at right angles to Fig. 1, of the combined water heater and garbage burner embodying the invention. Fig. 3 is a vertical view of one section of a modification of the device embodying the invention. Fig. 4 is a top plan view of the modification of the device wherein the section which is illustrated in Fig. 3 is used to form a part thereof. Fig. 5 is a vertical sectional view of such modification, on line 5—5 of Fig. 4, viewed in the direction indicated by the arrows, and Fig. 6 is a horizontal sectional view on line 6—6 of Fig. 2, viewed in the direction indicated by the arrows.

A reference letter applied to designate a given part is used to indicate such part, throughout the several figures of the drawing, wherever the same appears.

A is the base of the device, and is arranged so that the remainder of the device may be placed thereon.

B is the coal grate of the device.

C is one of the sections of the device and comprises the inner wall D and the outer wall E, arranged to obtain the water receptacle, or water leg F therein.

G is a section of the device and comprises the inner wall *d*, the outer wall *e* and the hollow grate bars H, all arranged to obtain the water receptacle *f* with which the hollow grate bars communicate.

I is a section of the device and comprises the inner wall *d'*, the outer wall *e'* and the hollow bars *h*, *h*, arranged to obtain the water receptacle *f'* communicating with the interior of such hollow bars *h*.

J is the fuel door and *j* the aperture through which coal or other like combustible matter is introduced into the fire box K.

J' is the garbage door and *j'* is the aperture through which garbage is introduced into the garbage chamber K'.

L is a passage way for the products of combustion, forming what may be termed a by-pass from the fire box K to the garbage chamber K'. This passage forms a by-pass which permits uninterrupted passage to the products of partial or complete combustion in the fire box to pass therefrom and to the smoke outlet M at such times as when the garbage in the chamber K' resting on the grate formed by hollow bars H chokes up the grate so that the passage of such products from the fire box K between the hollow grate bars H into the garbage chamber K' is prevented, or partially so.

N is an aperture in the upper wall of section C of the device.

*n*, *n*, are apertures in the end walls of section G and O a like aperture in the lower end wall of section I.

Apertures N and *n* and apertures *n* and O register when the several parts or sections C, G, and I are assembled.

P, P, are bolts provided with nuts *p*, *p*, thereon, by means of which the several sections C, G, and I are firmly held together, when assembled, such bolts passing through holes $p'$, $p'$, Fig. 6; and Q, Q, are gaskets placed between such sections to make the joints thereof water tight.

R $r$ are water inlets to part C and S is a water outlet to part I.

In the modification illustrated in Figs. 3, 4, and 5, I have used not less than five sections, and more may be used. These sections are lettered C′, G′, I′, I″, and I‴. Duplicates of section I′ are shown in Figs. 4 and 5. Section C′ has an inner and an outer wall whereby the water space F′ is obtained, and has the fuel door J and garbage door J′ thereon arranged to cover the apertures $j$, $j'$, through which fuel and garbage are, respectively, introduced into the fire box K and garbage chamber K′. Sections G′ and I′ are, respectively provided with a hollow grate bar H′ and with a semicircular opening through the upper end wall thereof, so that when duplicates of such sections are put together the smoke outlet M′ is obtained. Section I″ is provided with a hollow grate bar H′ and also with additional hollow bars $h'$, $h'$, to obtain the passage way L′ forming a like by pass from the fuel chamber to the garbage chamber K′, as does passage way L, Fig. 2, when the garbage chamber is so filled with garbage that the products of combustion in the fire box K cannot readily pass through between the hollow grate bars H′, H′, into such garbage chamber. The several sections in this modification are provided with the water inlets N′ and the water outlets O′ and with the holes $p'$ through which the bolts P′ are passed when the sections are assembled, and such sections are held together by such bolts P′ when the nuts $p''$ are placed thereon. In assembling the several sections C′, G′, I′, I″ and I‴ gaskets are put between them, to prevent leakage from water inlets N′ and water outlets O′, respectively, in the same manner as is done in assembling the sections C, G, and I.

The operation of the construction illustrated in Figs. 1, 2 and 6 and of the modification illustrated in Figs. 3, 4 and 5 is the same, and is as follows:—The device is connected up so that water will be supplied to and may be withdrawn from the water chambers thereof, and a fire is started in the fuel box, with said ordinary coal. Garbage may then be thrown into the garbage chamber. The products of combustion in the fuel chamber will pass therefrom through the spaces between the several hollow grate bars except at times when such spaces are partially or wholly choked up by the garbage; and at such times the products of such combustion will pass through the by pass into the garbage chamber, and from thence, together with the products of the combustion of garbage in chamber K′ will pass out through the smoke outlet.

It will be observed that by this construction the fire in the fuel box is at no time interfered with by the contents of the garbage chamber, while at the same time such contents of the garbage chamber are dried and ignited by the hot products of combustion from such fuel chamber, as quickly as where all of such products are forced to flow through between the hollow grate bars. By this construction when the passage ways between the grate bars are so filled or choked by the garbage thereon that the products of combustion in the fire box pass through the by pass such products are again introduced into the garbage chamber to heat and ignite the garbage therein. The water pipes are connected with the water inlets and outlets of this device to supply water thereto and convey water therefrom in the same manner as such pipes are connected to ordinary water heaters. The hollow grate bars H, H′, $h$, $h'$, are cast integral with the inner walls of the parts forming the garbage chamber of the device or they are inserted through such inner walls and enlarged or otherwise made water tight therein.

In the construction illustrated in Figs. 1, 2 and 3 it is very difficult when the hollow bars are not integral with the inner walls to make a water tight joint and hence in such construction it is particularly desirable to cast such bars integral with such parts.

Having thus described my invention what I claim as new and desire to secure by Letters Patent is;—

1. A combined water heater and garbage burner provided with a fire box, a garbage chamber and a smoke outlet from the garbage chamber, and comprising a plurality of sections each of such sections provided with an inner and an outer wall arranged to obtain a water receptacle therein, and such sections attached together so that the water receptacle in one section is in communication with the water receptacle of the adjacent section and hollow bars integral with the corresponding sections and respectively communicating with the water receptacles therein, such bars arranged to form a grate separating the fire box and the garbage chamber and to obtain a by pass arranged to discharge into the garbage chamber above the grate, and additional hollow bars arranged to prevent the by pass from becoming choked up, through which grate and by pass respectively, the products of combustion in the fire box may pass into the garbage chamber and to the smoke outlet.

2. A combined water heater and garbage burner provided with a fire box, a garbage chamber and a smoke outlet, consisting of sections of cast metal, each of such sections provided with an inner and an outer wall and end walls arranged to obtain water receptacles therein, and such receptacles respectively provided with an inlet and an outlet, bolts arranged to attach such sections together so that the water receptacles in one section is in communication with the water receptacle of the adjacent section through the inlets and outlets thereof, gaskets interposed between the respective inlets and the respective outlets, and hollow bars attached to corresponding sections and respectively communicating with the water receptacles therein, such bars arranged to form a grate separating the fire box and the garbage chamber and to obtain a by pass arranged to discharge into the garbage chamber above the grate, and additional hollow bars arranged to prevent the by pass from becoming choked up, through which grate and by pass, respectively, the products of combustion in the fire box may flow into the garbage chamber and to the smoke outlet; substantially as described.

3. In a combined water heater and garbage burner, the combination of a fire box, a garbage chamber, a grate consisting of hollow bars interposed between the fire box and the garbage burner and arranged to form the floor of the garbage chamber, such garbage chamber and fire box, respectively, provided with apertures for the introduction of garbage and fuel thereinto, doors to such apertures, a grate to the fire box, means to supply water to the hollow bars of the grate, a smoke outlet to the garbage chamber and a passage arranged to form a by pass around the grate of the garbage chamber and to discharge into such garbage chamber above said grate and additional hollow bars arranged to prevent the by pass from becoming choked up, through which grate and by pass, respectively, products of combustion in the fire box may flow to the garbage chamber and to the smoke outlet.

4. In a combined water heater and garbage burner, the combination of a fire box, a garbage chamber, a hollow grate interposed between the fire box and the garbage burners and arranged to form the floor of the garbage chamber, such garbage chamber and fire box, respectively, provided with apertures for the introduction of garbage and fuel thereinto, doors to such apertures, a grate to the fire box, means to supply water to the hollow grate, a smoke outlet to the garbage chamber and a passage arranged to form a by pass around the grate of the garbage chamber and to discharge into such garbage chamber above such grate, and hollow bars arranged to prevent the by pass from becoming clogged up, through which grate and by pass, respectively, products of combustion in the fire box may flow to the garbage chamber and to the smoke outlet.

5. In a combined water heater and garbage burner, the combination of a fire box, a garbage chamber, a grate interposed between the fire box and garbage chamber, such garbage chamber and fire box respectively provided with apertures for the introduction of garbage, and fuel thereinto, doors to such apertures, a grate to the fire box, a smoke outlet to the garbage chamber, and a passage arranged to form a by pass around the grate of the garbage chamber and to discharge into such garbage chamber above said grate, and hollow bars arranged to prevent the by pass from becoming clogged up, through which grate and by pass respectively products of combustion in the fire box may flow to the garbage chamber and to the smoke outlet.

6. In a combined water heater and garbage burner, the combination of a fire box, a garbage chamber, a grate interposed between the fire box and the garbage chamber, a smoke outlet to the garbage chamber, a passage way forming a by pass from the fire box to the chamber, and means to prevent said by pass from becoming choked up, through which grate and by pass respectively, products of combustion in the fire box may flow to the garbage chamber and to the smoke outlet.

7. In a combined water heater and garbage burner, the combination of a fire box, a garbage chamber, a grate interposed between the fire box and the garbage chamber, a water leg to the fire box and garbage chamber and said grate provided with passage ways communicating with said water leg, a smoke outlet to the garbage chamber, a passage way forming a by pass from the fire box to the garbage chamber, and means to prevent said by pass from becoming choked up, through which grate, by pass and means, respectively, products of combustion in the fire box may flow to the garbage chamber and to the smoke outlet.

JOHN J. DUBÉ.

In the presence of—
CHARLES TURNER BROWN,
CORA A. ADAMS.